Figure 1:
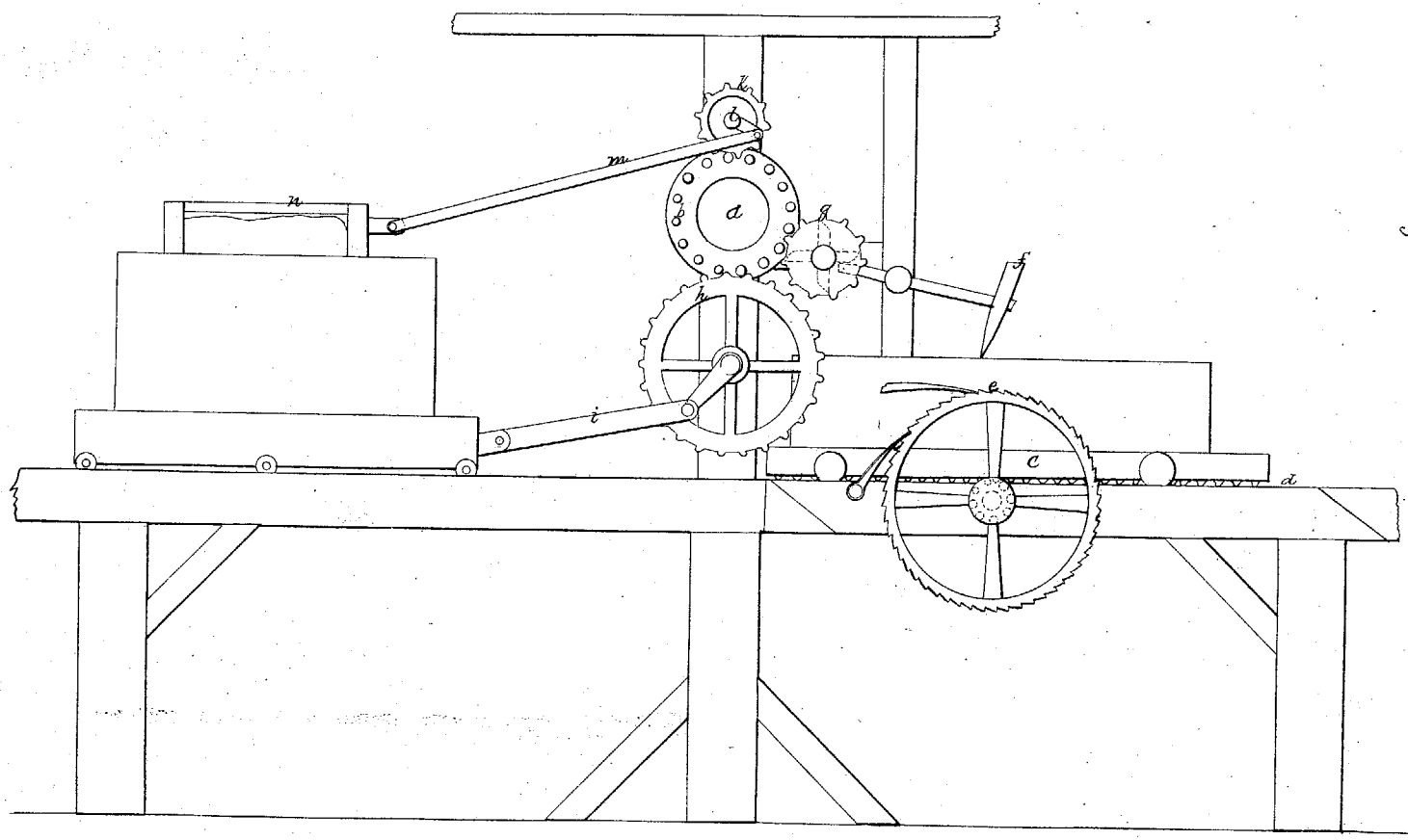
Figure 2:
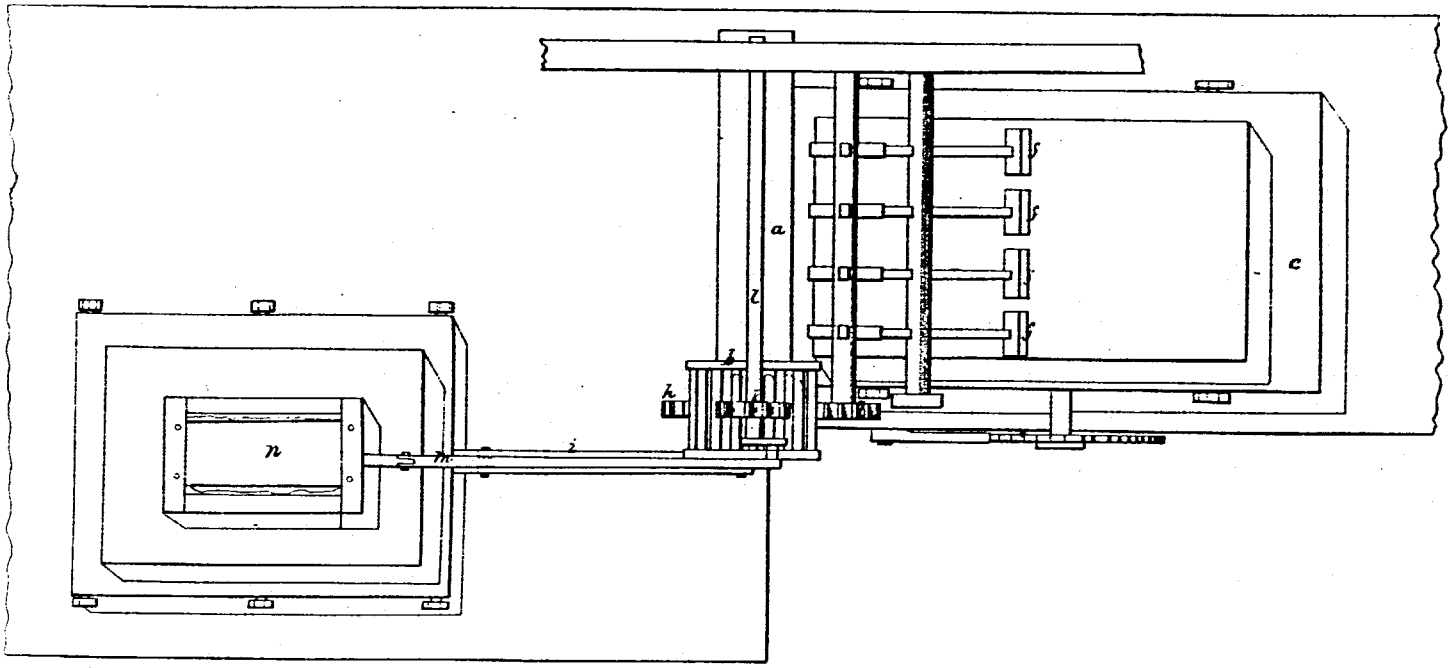

1261X

2 Sheets—Sheet 1.

A. Clark,

Dressing Stone.

Patented Apr. 10, 1810.

AM. PHOTO-LITHO. CO. N.Y. (OSBORNE'S PROCESS)

1261X

2 Sheets—Sheet 2.

A. Clark,

Dressing Stone.

Patented Apr. 10, 1810.

1261X April 10 1810 49

Anson Clark April 10, 1810

Letters Patent.

The Schedule referred to in these Letters Patent and making part of the same contain-
ing a description in the words of the said Anson Clark himself of his machine for cutting
chiseling rubbing and polishing Marble and other Stone This machine consisting of a horizontal shaft with a trundle head at the end of it to be turn-
ed with or without the use of water. A carriage of plank lying on rollers with cogs on
which the marble is to lie to be cut or chiseled. A cog wheel with iron dogs which car-
riage is moved nearly in the same manner, and is nearly on similar construction as
a carriage to a common sawmill. over this carriage and when the stone is to lie, is
placed on the end of two arms an iron bar, in which are set a number of steel chisels
which by means of cogwheels in the horizontal shaft aforesaid is continually rising and
falling with said Chisels on the marble lying on said carriage till the same is
need of a given thickness connected with and to operate on the trundle head on
the horizontal shaft first mentioned is a large cog wheel with a shaft and crank
at the end of it. on this crank is a horizontal pittman fastened to another carriage
on which the marble lies for rubbing and polishing. Also connected with and to operate
upon the trundle head on the shaft first mentioned is another smaller Cog wheel
with a shaft and crank at the end of it. on this crank also is a pittman fastened
to a frame containing a piece of Marble which lies on the marble or stone placed
on the last mentioned carriage When this machine is in motion this last mentioned
carriage together with the marble on it and the piece of marble secured in said frame
will each move in a direct opposite manner and by means of the friction complete
the rubbing and polishing Anson Clark 6.40 1196

Witnesses
Robbins Kellogg
Richd Griffing 380 words

Patented April 10. 1810.
Drawing mar. to [illegible]